US009024740B2

(12) United States Patent
Min et al.

(10) Patent No.: US 9,024,740 B2
(45) Date of Patent: May 5, 2015

(54) SYSTEM AND METHOD OF PROVIDING WARNING TO PEDESTRIAN USING LASER BEAM

(75) Inventors: Kyoung Moo Min, Gyeonggi-do (KR); Kyung Ho Yoo, Gyeonggi-do (KR); Yoon Ho Jang, Gyeonggi-do (KR); Seong Su Im, Gyeonggi-do (KR); Hui Sung Lee, Gyeonggi-do (KR); Jin Hak Kim, Seoul (KR); Eun Jin Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 125 days.

(21) Appl. No.: 13/556,759

(22) Filed: Jul. 24, 2012

(65) Prior Publication Data
US 2013/0154815 A1    Jun. 20, 2013

(30) Foreign Application Priority Data

Dec. 14, 2011   (KR) .................. 10-2011-0134139

(51) Int. Cl.
*B60Q 1/00* (2006.01)
*B60Q 1/08* (2006.01)
*B60Q 1/18* (2006.01)

(52) U.S. Cl.
CPC *B60Q 1/085* (2013.01); *B60Q 1/18* (2013.01); *B60Q 2400/50* (2013.01); *B60Q 2300/45* (2013.01)

(58) Field of Classification Search
USPC ............. 340/425.5, 435, 436, 901, 904, 902, 340/903, 552, 555, 556, 557, 438, 933, 942
See application file for complete search history.

(56) References Cited

U.S. PATENT DOCUMENTS

| 5,529,138 | A  | * | 6/1996  | Shaw et al. ................. 180/169 |
| 6,061,001 | A  | * | 5/2000  | Sugimoto .................... 340/903 |
| 2004/0207519 | A1 | * | 10/2004 | Tracy ............................ 340/467 |
| 2005/0269481 | A1 | * | 12/2005 | David et al. ............... 250/208.1 |
| 2006/0111820 | A1 | * | 5/2006  | Goetting et al. ................ 701/29 |
| 2007/0090688 | A1 | * | 4/2007  | Haemmerling et al. .......... 303/7 |
| 2007/0219720 | A1 | * | 9/2007  | Trepagnier et al. ........... 701/300 |
| 2008/0019567 | A1 | * | 1/2008  | Takagi et al. ................. 382/103 |
| 2010/0253493 | A1 | * | 10/2010 | Szczerba et al. ............. 340/435 |
| 2012/0081542 | A1 | * | 4/2012  | Suk et al. ...................... 348/139 |

FOREIGN PATENT DOCUMENTS

| JP | 2005161977 A     | 6/2005  |
| KR | 20-1999-0002465 U | 1/1999  |
| KR | 10-2009-0110037 A | 10/2009 |

* cited by examiner

*Primary Examiner* — Daniel Previl
(74) *Attorney, Agent, or Firm* — Mintz Levin Cohn Ferris Glovsky and Popeo, P.C.; Peter F. Corless

(57) ABSTRACT

Disclosed herein is a system and method of providing a warning to a pedestrian using a laser beam. In particular, objects present in a detection area of a front impact sensor provided on a vehicle are detected. A movement path vector of a first moving object that is moving in a direction identical to that of the vehicle, among the objects present in the detection area, is generated. When the movement path vector of the first moving object falls within an error range of a movement vector of the vehicle, the first moving object is designated as belonging to a group of laser warning target candidates, and thereafter an emission angle of a laser beam is generated. The laser beam is emitted through a laser light based on the emission angle of the laser beam.

13 Claims, 4 Drawing Sheets

SYSTEM AND METHOD OF PROVIDING WARNING TO PEDESTRIAN USING LASER BEAM

CROSS-REFERENCE TO RELATED APPLICATIONS

The present application claims priority to Korean Patent Application No. 10-2011-0134139 filed on Dec. 14, 2011, the entire contents of which is incorporated herein for purposes by this reference.

BACKGROUND OF THE INVENTION

1. Field of the Invention

The present invention relates to a technology for a system and method of providing a warning to a pedestrian using a laser beam when the pedestrian is located ahead of a direction in which a vehicle is moving.

2. Description of the Related Art

As shown in FIG. 1, when pedestrians are located ahead of the traveling direction of a vehicle 1, existing schemes presented to date are configured so that a driver may manually operate a horn provided in the vehicle 1 to emit a sound. However, when a driver operates a horn in an area having a quiet surrounding environment, such as a residential street or a school, this can create noise pollution. In particular, a disadvantage of such a scheme is that third parties have to listen to a loud horn sound which may also cause a pedestrian stress. Further, due to local characteristics, in specific sections, traffic laws may prohibit a driver from operating a horn. In such an area, there is no method of notifying a pedestrian that a vehicle is traveling.

With the rapid development of automobile technology, noise emitted from a traveling vehicle have been decreased more and more. In particular, with the popularization of environment-friendly vehicles, such as electric vehicles, a scheme for providing a warning to a pedestrian using a device other than the horn is required.

The foregoing is intended merely to aid in the better understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the prior art, and an object of the present invention is to provide a method of providing a warning to a pedestrian using a laser beam, which projects the laser beam onto a road surface located ahead of the pedestrian, thus notifying the pedestrian that a vehicle is approaching.

In order to accomplish the above object, the present invention provides a system and method of providing a warning to a pedestrian using a laser beam, including detecting objects present in a detection area of a front impact sensor provided on a vehicle, and generating a movement path vector of a first moving object that is moving in a direction identical to that of the vehicle among the objects present in the detection area by a control unit. When the movement path vector of the first moving object falls within an error range of a movement vector of the vehicle, the control unit designates the first moving object as belonging to a group of laser warning target candidates, and thereafter generates a signal controlling an emission angle of a laser beam. The laser beam is then emitted through a laser light based on the emission angle of the laser beam.

Preferably, among the objects present in the detection area, a fixed object and a second moving object that is moving in a direction different from that of the vehicle may be designated as belonging to a group of laser warning exception candidates Preferably, when the movement path vector of the first moving object falls within a range of ±10° of the movement vector of the vehicle, the first moving object may be designated as belonging to the group of laser warning target candidates; and when the movement path vector of the first moving object falls outside the range of ±10°, the first moving object may be designated as belonging to a group of laser warning exception candidates.

Preferably, the laser beam emitted through the laser light may be projected onto a ground surface located ahead of the first moving object in a direction in which the first moving object is moving. Preferably, the emission angle of the laser beam may be generated by the following equations (1) and (2):

$$\theta 1 = \tan((Y1+Y2)/(X2+X2)) \quad (1)$$

$$\theta 2 = \tan((H1)/(X1+X2)) \quad (2)$$

where θ1 denotes an angle of lateral rotation of the laser light, θ2 denotes an angle of vertical rotation of the laser light, X1 denotes an interval between the front impact sensor and the first moving object, X2 denotes an interval between the first moving object and a location onto which the laser beam is projected, H1 denotes a height from the ground surface to the laser light, Y1 denotes an interval between a center of a front of the vehicle and a center of the first moving object, and Y2 denotes an interval between the center of the front of the vehicle and the laser light.

Preferably, the system and method may further include generating a movement path vector of the new moving object when a new moving object other than the first moving object designated as belonging to the group of laser warning target candidates is present in the detection area; and designating the new moving object as belonging to the group of laser warning target candidates when the movement path vector of the new moving object falls within the error range of the movement vector of the vehicle. More specifically, when it does not fall within the error range of the movement vector of the vehicle, the control unit designates the new moving object as belonging to a group of laser warning exception candidates.

Preferably, when the movement path vector of the new moving object falls within a range of ±10° of the movement vector of the vehicle, the new moving object may be designated as belonging to the group of laser warning target candidates; and when the movement path vector of the new moving object falls outside the range of ±10°, the new moving object may be designated as belonging to the group of laser warning exception candidates.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of a method of providing a warning to a pedestrian using a laser beam according to the present invention will be described in detail with reference to the attached drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network Additionally, although the exemplary embodiment is described as using one control unit to perform the above process, it is understood that the above processes may also be performed by a plurality of control units, controllers, processors or the like.

Figure 1:
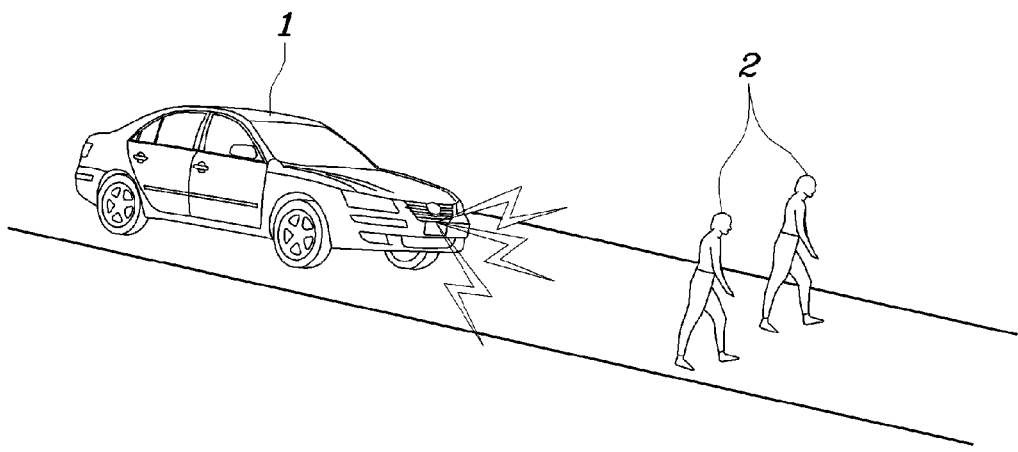
FIG. 1 is a diagram showing a conventional method of providing a warning to a pedestrian using a horn.
Figure 2:
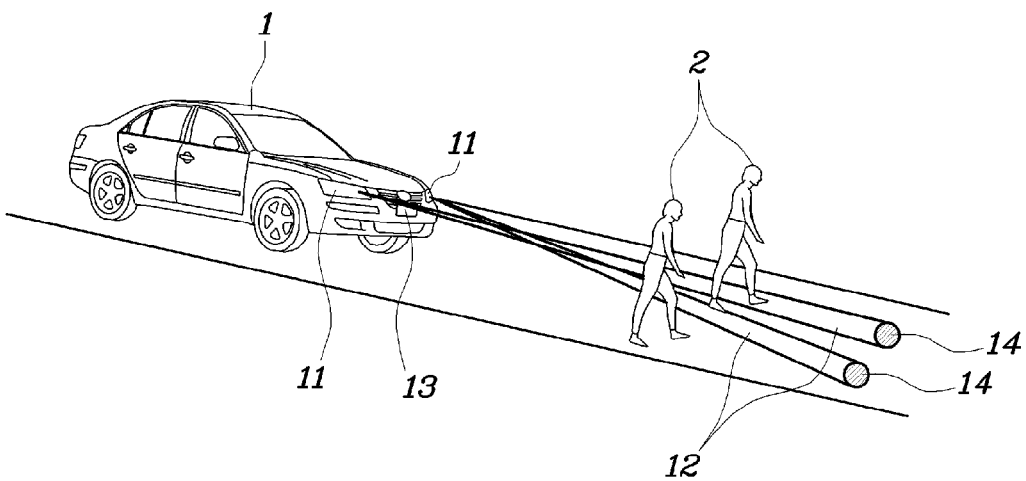
FIGS. 2 to 6 are diagrams showing a method of providing a warning to a pedestrian using a laser beam according to the exemplary embodiment of the present invention.

As shown in FIG. 2, the present invention relates to a technology for projecting laser beams 12 onto a road surface located ahead of directions in which pedestrians 2 are moving, using laser lights 11 provided on a vehicle 1 when the pedestrians 2 are present ahead of a direction in which the vehicle 1 is traveling, thus warning the pedestrians 2 that the vehicle 1 is approaching.

For this, a front impact sensor 13 capable of detecting an object is provided on a center of the front of the vehicle 1 is installed on the vehicle. The front impact sensor 13 may be implemented as, for example, a distance measurement sensor (a laser scanner or radar) capable of measuring distance to each pedestrian 2.

The laser lights 11 are preferably mounted on the left and right sides of the vehicle 1, together with headlights, and are preferably implemented as laser diodes that can be generally projected in various colors and that have low power consumption. Further, the laser lights 11 may be configured to be rotatable laterally and vertically so as to be adjusted dynamically by the system. Furthermore, the vehicle 1 includes a controller (control unit)(not shown) having a function of controlling the operation of the laser lights 11 based on a signal from the front impact sensor 13. Reference numeral 14 of FIG. 2, not described yet, denotes points on which laser beams 12 are projected onto the ground surface.

Figure 3:
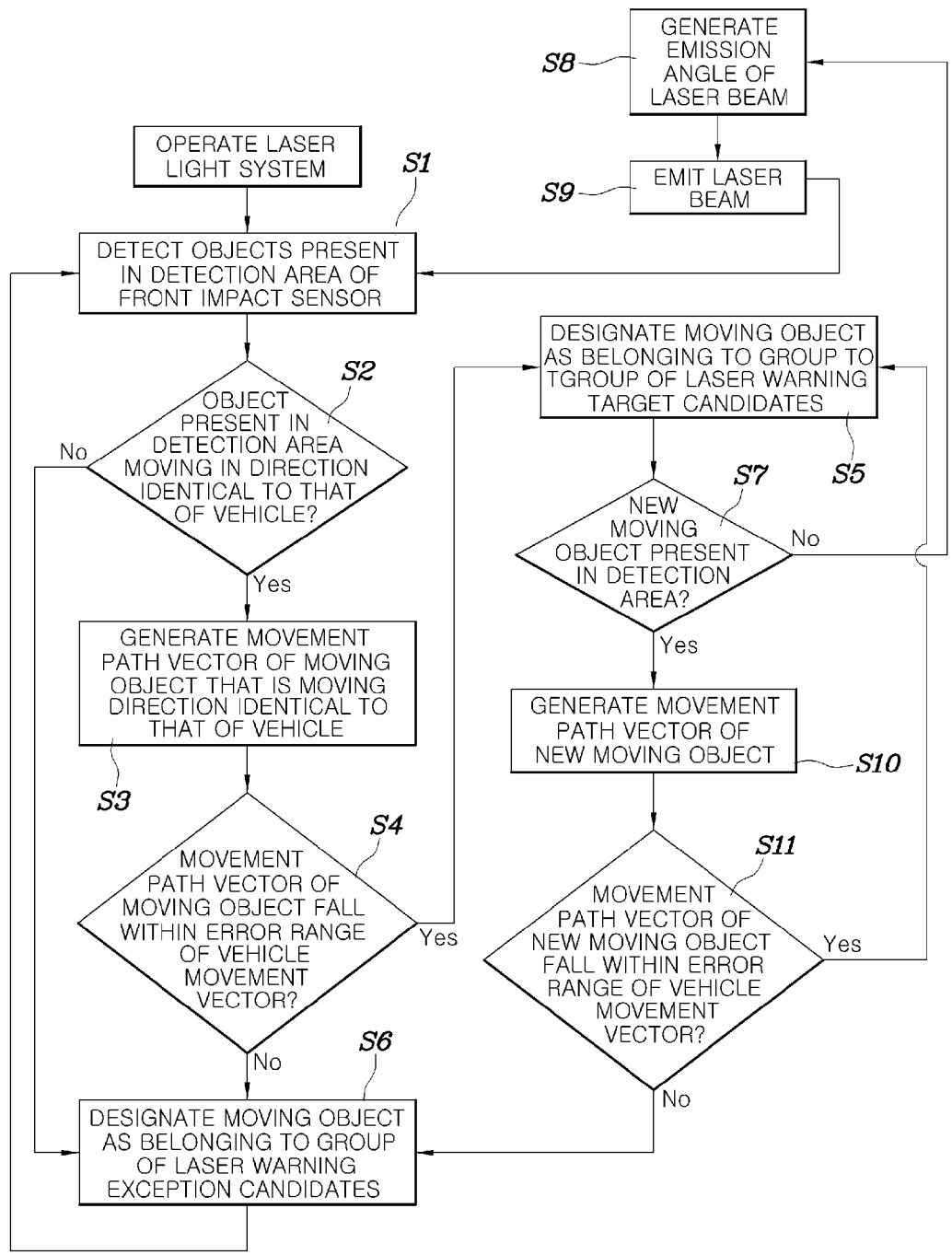
Figure 4:
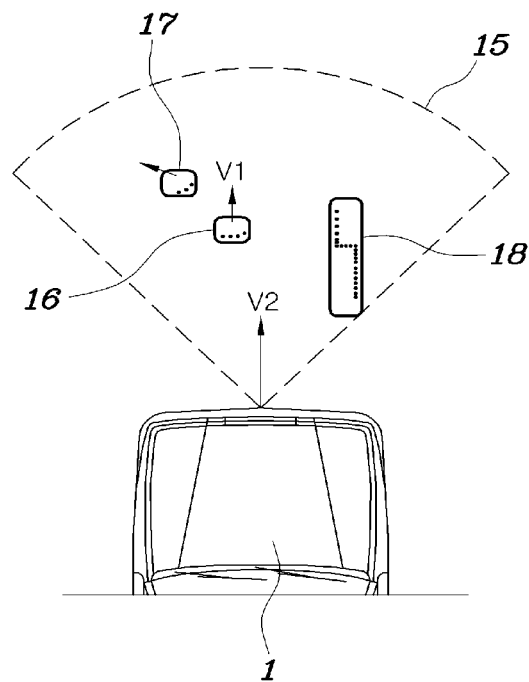
Figure 5:
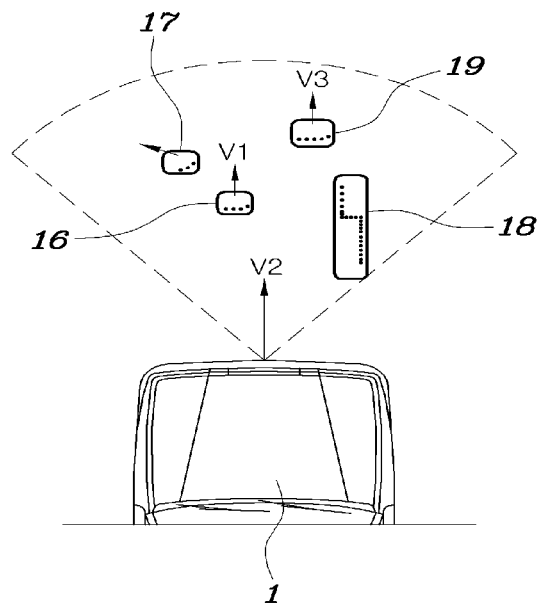

Hereinafter, the method of providing a warning to a pedestrian using a laser beam according to the present invention will be described in detail with reference to FIGS. 3 to 5. The below method may be controlled by the controller and the front impact sensor discussed above.

When the laser light system of the vehicle is operated, the front impact sensor 13 mounted on the front of the vehicle 1 is operated, and then detects objects present in a detection area 15 in step S1. The objects present in the detection area 15 may mainly include a moving object 16 that is moving in a direction identical to that of the vehicle 1, a moving object 17 that is moving in a direction different from that of the vehicle 1, and/or a fixed object 18 that is not moving at all.

In the present invention, the moving objects 16 and 17 can be interpreted by the controller as pedestrians, and the fixed object 18 can be interpreted by the controller as a fixed obstacle. When the front impact sensor 13 detects these objects, it is determined whether the objects are moving in the direction identical to that of the vehicle 1 in step S2. When a moving object 16 that is moving in the direction identical to that of the vehicle 1 is present among the detected objects, a movement path vector V1 for the moving object 16 is generated in step S3. Further, the fixed object 18 and the moving object 17 that is moving in the direction different from that of the vehicle 1, among the objects present in the detection area 15, are designated as belonging to a group of laser warning exception candidates.

Meanwhile, when it is determined whether the movement path vector V1 of the moving object 16 falls within the error range of a movement vector V2 in which the vehicle 1 is traveling in step S4, the moving object 16 is designated as belonging to a group of laser warning target candidates when it is determined that the movement path vector V1 of the moving object 16 falls within the error range of the movement vector V2 in which the vehicle 1 is traveling in step S5. In contrast, when it is determined that the movement path vector V1 falls outside the error range of the movement vector V2 of the vehicle, the moving object 16 is designated as belonging to the group of laser warning exception candidates in step S6.

In greater detail, when the movement path vector V1 of the moving object 16 falls within a range of ±10° of the movement vector V2 of the vehicle, the moving object 16 is designated as belonging to the group of laser warning target candidates, whereas when the movement path vector V1 falls outside the range of ±10°, the moving object 16 is designated as belonging to the group of laser warning exception candidates. The allowable error range of ±10° of the movement vector V2 may be adjusted to various other angles as needed. However, when the allowable error range falls out of the range of ±10°, the precision of the laser light system may be greatly deteriorated, and thus it is preferable to maintain this error range. Further, laser beams are not projected onto objects which are designated as belonging to the group of laser warning exception candidates, as described above.

After the moving object 16 has been designated as belonging to the group of laser warning target candidates, it is determined once again whether a new moving object 19 that starts to move is present in the detection area 15 before the laser beam 12 is emitted in step S7. In this case, when it is determined that a new moving object 19 that starts to move is not present in the detection area 15, an emission angle at which the laser beam 12 is to be emitted is dynamically generated in step S8, and the laser beam 12 is emitted through the laser light 11 on the basis of the emission angle of the laser beam in step S9.

The laser beam 12 emitted through the laser light 11 is preferably projected onto the ground surface located ahead of the moving object 16 in the direction in which the moving object 16 is moving. When the laser beam 12 is projected onto the ground surface located behind or beside the moving object 16, the pedestrian may be prevented from perceiving the laser beam. Further, when the laser beam 12 is directly projected onto the moving object 16, the pedestrian may become disorientated or feel uncomfortable.

Figure 6:
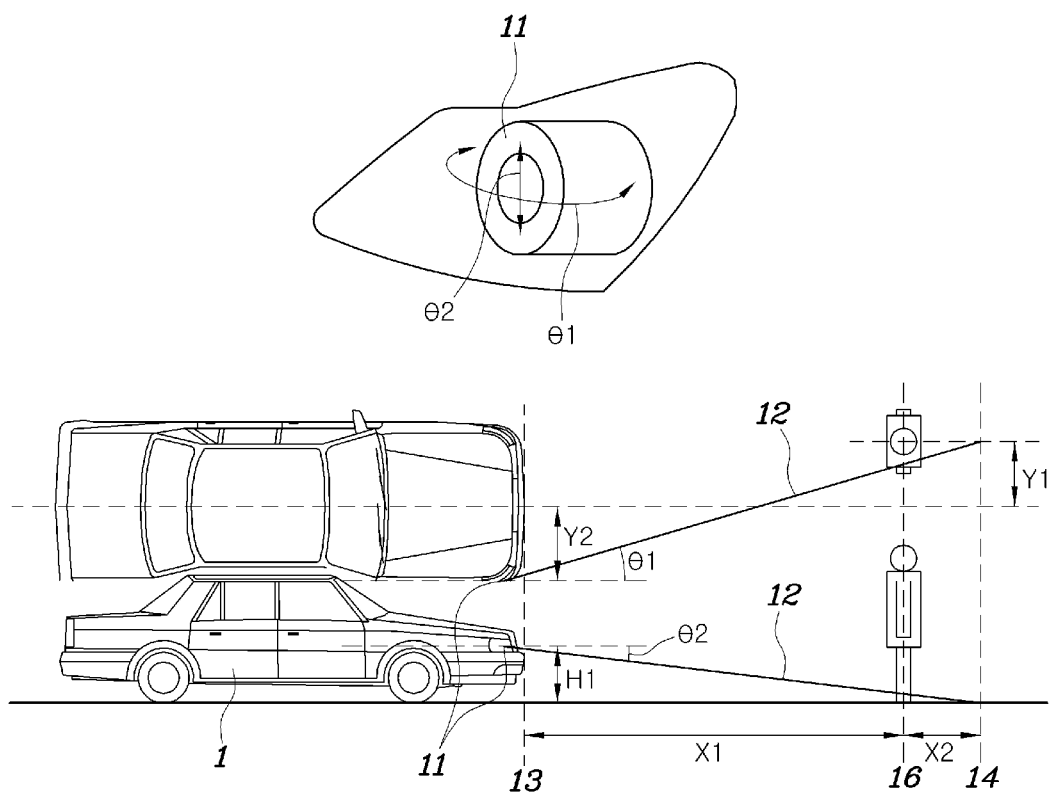

Further, the emission angle of the laser beam is generated by the following Equations (1) and (2), as shown in FIG. 6:

$$\theta 1 = \tan((Y1+Y2)/(X1+X2)) \qquad (1)$$

$$\theta 2 = \tan((H1)/(X1+X2)) \qquad (2)$$

where θ1 denotes the angle of lateral rotation of the laser light 11, θ2 denotes the angle of vertical rotation of the laser light 11, X1 denotes an interval between the front impact sensor 13 and the moving object 16, X2 denotes an interval between the moving object 16 and the location 14 onto which the laser beam 12 is projected, H1 denotes a height from the ground surface to the laser light 11, Y1 denotes an interval between the center of the front of the vehicle 1 and the center of the moving object 16, and Y2 denotes an interval between the center of the front of the to vehicle 1 and the laser light 11.

Meanwhile, when it is determined that a new moving object 19 that starts to move is present in the detection area 15 after the moving object 16 has been designated as belonging to the group of laser warning target candidates, the movement path vector V3 of the new moving object 19 is generated in step S10. When the movement path vector V3 of the new moving object 19 falls within the error range of the vehicle movement vector V2 in step S11, the moving object is designated as belonging to the group of laser warning target candidates (return to step S5). In contrast, when it determined that the movement path vector V3 does not fall within the error range of the vehicle movement vector V2, the new moving object 19 is designated as belonging to the group of laser warning exception candidates (return to step S6). Here, similarly to the moving object 16, the error range of the new moving object 19 is also preferably set to the range of ±10° of the vehicle movement vector V2.

As described above, the embodiments of the present invention relate to a technology for providing a warning to a pedestrian using laser beams 12 projected through the laser lights 11, rather than providing a warning to the pedestrian using the horn of the vehicle. Advantageously, the present invention prevents pedestrians from feeling uncomfortable and advantageously reduces the amount of noise emitted from vehicles in quite areas.

Accordingly, the method of providing a warning to a pedestrian using a laser beam according to the present invention is advantageous in that it can notify the pedestrian that a vehicle is traveling by projecting the laser beam onto a road surface located ahead of the pedestrian, thus preventing the pedestrian from feeling displeasure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a warning to a pedestrian using a laser beam, comprising:
   detecting, by a sensor, objects present in a detection area of a front impact sensor provided on a vehicle;
   generating, by a control unit, a movement path vector of a first moving object that is moving in a direction identical to that of the vehicle among the objects present in the detection area;
   in response to the movement path vector of the first moving object falling within an error range of a movement vector of the vehicle, designating, by the control unit, the first moving object as belonging to a group of laser warning target candidates, and thereafter generating an emission angle of a laser beam;
   emitting the laser beam through a laser light based on the generated emission angle of the laser beam;
   generating a movement path vector of a new moving object when the new moving object other than the first moving object designated as belonging to the group of laser warning target candidates is present in the detection area;
   designating the new moving object as belonging to the group of laser warning target candidates when the movement path vector of the new moving object falls within the error range of the movement vector of the vehicle; and
   designating the new moving object as belonging to a group of laser warning exception candidates when the movement path vector of the new moving object does not fall within the error range of the movement vector of the vehicle.

2. The method according to claim 1, wherein among the objects present in the detection area, a fixed object and a second moving object moving in a direction different from that of the vehicle are designated as belonging to a group of laser warning exception candidates.

3. The method according to claim 1, wherein:
   when the movement path vector of the first moving object falls within a range of ±10° of the movement vector of the vehicle, the first moving object is designated as belonging to the group of laser warning target candidates; and
   when the movement path vector of the first moving object falls outside the range of ±10°, the first moving object is designated as belonging to a group of laser warning exception candidates.

4. The method according to claim 1, wherein the laser beam emitted through the laser light is projected onto a ground surface located ahead of the first moving object in a direction in which the first moving object is moving.

5. The method according to claim 4, wherein the emission angle of the laser beam is generated by the following equations (1) and (2):

$$\theta 1 = \tan((Y1+Y2)/(X1+X2)) \qquad (1)$$

$$\theta 2 = \tan((H1)/(X1+X2)) \qquad (2)$$

where θ1 denotes an angle of lateral rotation of the laser light, θ2 denotes an angle of vertical rotation of the laser light, X1 denotes an interval between the front impact sensor and the first moving object, X2 denotes an interval between the first moving object and a location onto which the laser beam is projected, H1 denotes a height from the ground surface to the laser light, Y1 denotes an interval between a center of a front of the vehicle and a center of the first moving object, and Y2 denotes an interval between the center of the front of the vehicle and the laser light.

6. The method according to claim 1, wherein:
   when the movement path vector of the new moving object falls within a range of ±10° of the movement vector of the vehicle, the new moving object is designated as belonging to the group of laser warning target candidates; and
   when the movement path vector of the new moving object falls outside the range of ±10°, the new moving object is designated as belonging to the group of laser warning exception candidates.

7. A non-transitory computer readable medium containing program instructions executed by a processor or controller, the computer readable medium comprising:
   program instructions that detect objects present in a detection area of a front impact sensor provided on a vehicle;

program instructions that generate a movement path vector of a first moving object that is moving in a direction identical to that of the vehicle among the objects present in the detection area;

program instructions that designate the first moving object as belonging to a group of laser warning target candidates, and thereafter generating an emission angle of a laser beam in response to the movement path vector of the first moving object falling within an error range of a movement vector of the vehicle; program instructions that emit the laser beam through a laser light based on the generated emission angle of the laser beam;

program instructions that generate a movement path vector of a new moving object when the new moving object other than the first moving object designated as belonging to the group of laser warning target candidates is present in the detection area;

program instructions that designate the new moving object as belonging to the group of laser warning target candidates when the movement path vector of the new moving object falls within the error range of the movement vector of the vehicle; and program instructions that designate the new moving object as belonging to a group of laser warning exception candidates when the movement path vector of the new moving object does not fall within the error range of the movement vector of the vehicle.

8. The non-transitory computer readable medium according to claim 7, wherein among the objects present in the detection area, a fixed object and a second moving object moving in a direction different from that of the vehicle are designated as belonging to a group of laser warning exception candidates.

9. The non-transitory computer readable medium according to claim 7, wherein:

when the movement path vector of the first moving object falls within a range of ±10° of the movement vector of the vehicle, the first moving object is designated as belonging to the group of laser warning target candidates; and when the movement path vector of the first moving object falls outside the range of ±10°, the first moving object is designated as belonging to a group of laser warning exception candidates.

10. The non-transitory computer readable medium according to claim 7, wherein the laser beam emitted through the laser light is projected onto a ground surface located ahead of the first moving object in a direction in which the first moving object is moving.

11. The non-transitory computer readable medium according to claim 10, wherein the emission angle of the laser beam is generated by the following equations (1) and (2):

$$\theta 1 = \tan((Y1+Y2)/(X1+X2)) \quad (1)$$

$$\theta 2 = \tan((H1)/(X1+X2)) \quad (2)$$

where θ1 denotes an angle of lateral rotation of the laser light, θ2 denotes an angle of vertical rotation of the laser light, X1 denotes an interval between the front impact sensor and the first moving object, X2 denotes an interval between the first moving object and a location onto which the laser beam is projected, H1 denotes a height from the ground surface to the laser light, Y1 denotes an interval between a center of a front of the vehicle and a center of the first moving object, and Y2 denotes an interval between the center of the front of the vehicle and the laser light.

12. The non-transitory computer readable medium according to claim 7, wherein:

when the movement path vector of the new moving object falls within a range of ±10° of the movement vector of the vehicle, the new moving object is designated as belonging to the group of laser warning target candidates; and when the movement path vector of the new moving object falls outside the range of ±10°, the new moving object is designated as belonging to the group of laser warning exception candidates.

13. A system of providing a warning to a pedestrian using a laser beam, comprising:

a sensor mounted in a front portion of a vehicle configured to detect objects present in a detection area of a front impact sensor provided on a vehicle;

a control unit configured to generate a movement path vector of a first moving object that is moving in a direction identical to that of the vehicle among the objects present in the detection area, designate the first moving object as belonging to a group of laser warning target candidates in response to the movement path vector of the first moving object falling within an error range of a movement vector of the vehicle and thereafter generate an emission angle of a laser beam; and a laser light configured to emit the laser beam based on the generated emission angle of the laser beam, wherein a movement path vector of a new moving object is generated when the new moving object other than the first moving object designated as belonging to the group of laser warning target candidates is present in the detection area;

the new moving object is designated as belonging to the group of laser warning target candidates when the movement path vector of the new moving object falls within the error range of the movement vector of the vehicle; and the new moving object is designated as belonging to a group of laser warning exception candidates when the movement path vector of the new moving object does not fall within the error range of the movement vector of the vehicle.

* * * * *